J. W. & M. H. Weston,
Ditching Machine.

No. 97,464.  Patented Nov. 30, 1869.

Witnesses
Gustave Dietrich
Alex S. Roberts

Inventors
J. W. Weston
M. H. Weston
Per Munn & Co

UNITED STATES PATENT OFFICE.

J. W. WESTON AND M. H. WESTON, OF WINDSOR, ILLINOIS.

IMPROVEMENT IN DITCHING-MACHINES.

Specification forming part of Letters Patent No. 97,464, dated November 30, 1869.

*To all whom it may concern:*

Be it known that we, J. W. WESTON and M. H. WESTON, of Windsor, in the county of Shelby and State of Illinois, have invented a new and useful Improvement in Ditching-Machines; and we do hereby declare that the following is a full, clear, and exact description thereof, which will enable others skilled in the art to make and use the same, reference being had to the accompanying drawings, forming part of this specification, in which—

Figure 1:
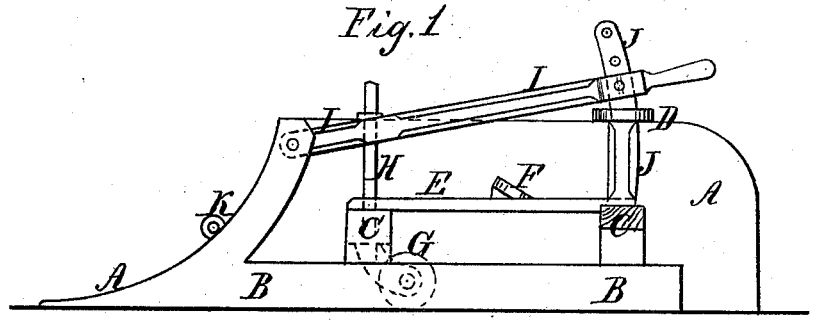
Figure 2:
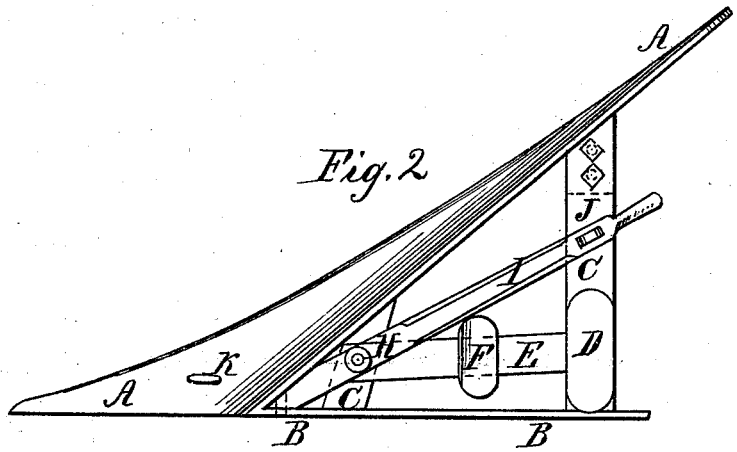

Figure 1 is a side view of our improved machine. Fig. 2 is a top view of the same.

Similar letters of reference indicate corresponding parts.

Our invention has for its object to furnish a simple, convenient, and effective machine for digging ditches, grading roads, raising hedgerows, and similar uses; and it consists in the construction and combination of the various parts, as hereinafter more fully described.

A is the mold-board, which we prefer to make of plow-mold-board steel, and which is about fourteen feet long and about eleven inches wide. The mold-board is curved at its forward end, as shown in Figs. 1 and 2, to cause the point to act as a share.

B is the landside of the machine, which is about twelve feet long, four inches wide, and half an inch thick. The machine is about six feet wide at its rear end. The mold-board and landside are supported against side pressure by cross-beams C, to which the said mold-board and landside are securely bolted with countersunk bolts.

D is the driver's seat, which is supported from the rear beam, C. The beams C may be connected by a board or bar, E, to which may be attached a foot-rest, F, for the driver's feet.

G is a caster-wheel, the standard H of which passes up through the forward bar or beam, C, and the upper end of which is attached to the lever I, the forward end of which is pivoted to the forward part of the machine, and the rear end of which extends back into such a position that it may be conveniently reached and operated by the driver from his seat. The rear part of the lever I is slotted to receive the curved guide-bar J, the lower end of which is securely attached to the rear cross-beam, C, and which is perforated with numerous holes to receive a pin for securing the lever I in any position into which it may be adjusted. By means of the lever I and caster-wheel G H the point of the machine may be raised even when working, to pass a hollow place in the land or for convenience in turning.

K is the staple to which the draft is attached, and which is set at the side of the forward end or colter of the mold-board A, to counterbalance the side draft of the machine.

In using the machine it is drawn back and forth in the line of the ditch, raising the soil and forcing it out at the sides of the ditch, leaving the said sides inclined or sloping, so that a wagon may be easily driven across it, and so as to offer no obstruction to the operation of a reaper or mower.

Having thus described our invention, we claim as new and desire to secure by Letters Patent—

An improved ditching-machine formed by the combination of the mold-board A, landside B, cross bars or beams C, caster-wheel G H, lever I, and guide-bar J with each other, said parts being constructed, arranged, and operating substantially as herein shown and described, and for the purposes set forth.

J. W. WESTON.
M. H. WESTON.

Witnesses:
C. M. SARGENT,
L. C. JACKSON.